United States Patent Office 3,021,602
Patented Feb. 20, 1962

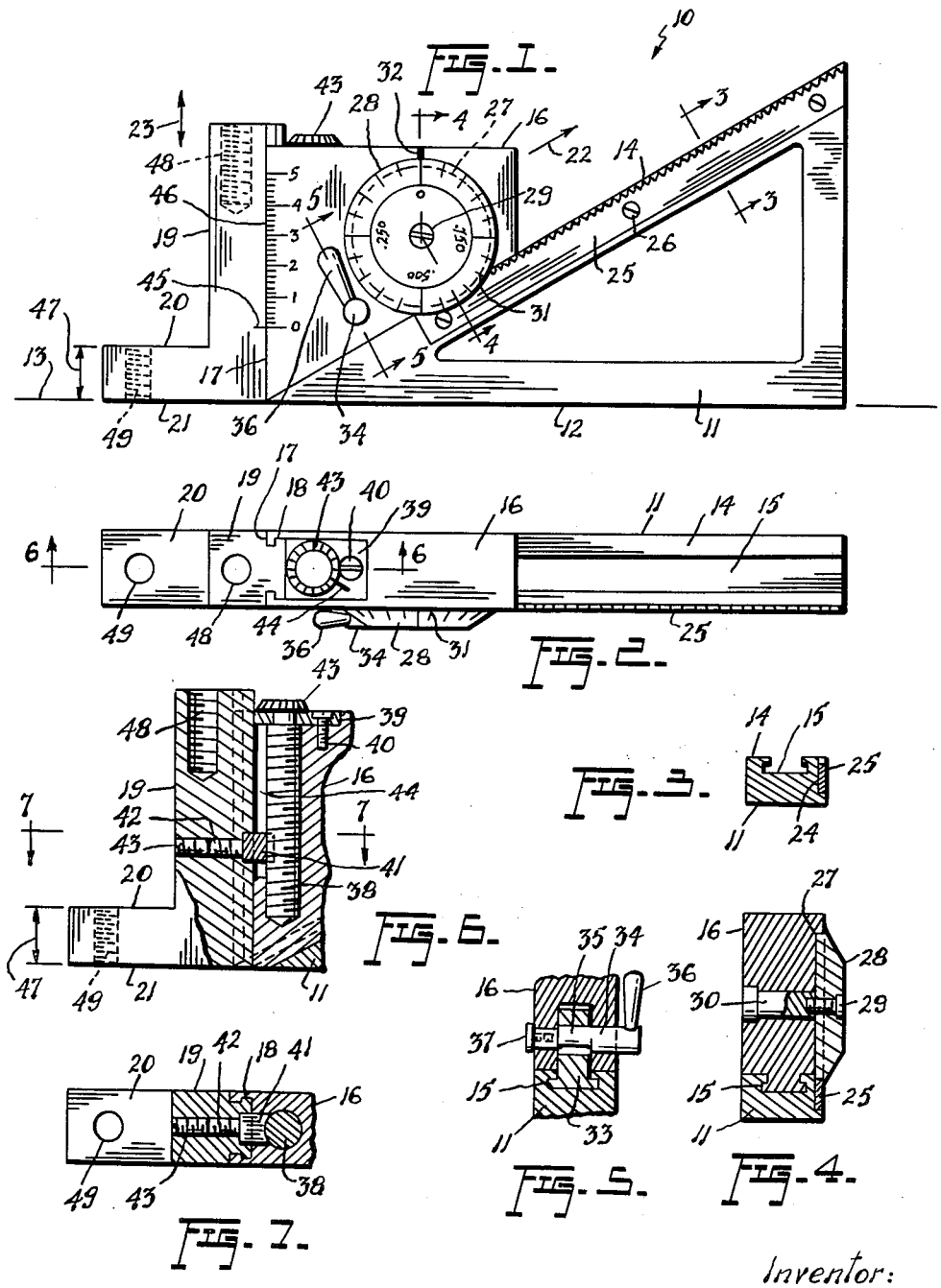

3,021,602
MEASURING INSTRUMENTS
Hans Zimmerman, 162 Southwood Drive,
San Francisco, Calif.
Filed Sept. 4, 1959, Ser. No. 838,121
4 Claims. (Cl. 33—170)

This invention relates to new and useful improvements in measuring instruments, particularly those used by machinists and the like, and the principal object of the invention is to facilitate easy, accurate and convenient measuring of heights, depths, cutting tool settings, et cetera, without the use of a convenional micrometer.

This object is attained by the provision of a measuring instrument having a triangular body adapted to be positioned on a supporting surface, a block which is slidable longitudinally on an inclined edge of the body and may be releasably locked in a pre-adjusted position thereon, and a locating member which is slidable vertically relative to the block by screw-actuated means, the locating member having one or more faces which, upon sliding of the member, may be moved toward and away from the supporting surface of the body so that the distance between such a face or faces and the supporting surface may be easily and accurately determined by indicating means with which the instrument is also equipped.

Some of the advantages of the invention reside in its simplicity of construction, efficient and convenient operation, and in its adaptability to economial manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a measuring instrument in accordance with the invention;

FIGURE 2 is a top plan view thereof;

FIGURE 3 is a sectional detail, taken substantially in the plane of the line 3—3 in FIGURE 1;

FIGURE 4 is a sectional view, taken substantially in the plane of the line 4—4 in FIGURE 1;

FIGURE 5 is a fragmentary sectional view, taken substantially in the plane of the line 5—5 in FIGURE 1;

FIGURE 6 is a fragmentary sectional view, taken satntially in the plane of the line 6—6 in FIGURE 2; and FIGURE 7 is a fragmentary secitonal view, taken substantially in the plane of the line 7—7 in FIGURE 6.

Referring now to the accompanying drawings in detail, the measuring instrument in accordance with the invention is designated generally by the reference numeral 10 and embodies in its construction a body 11 which, for sake of lightness in weight, is in the form of a triangular frame, having a base edge 12 adapted to be positioned on a supporting surface 13. As shown, the base edge 12 is horizontal, and the body 11 also has an upper edge 14 which is inclined by an acute angle (preferably 30°) from the base edge and is formed with a longitudinally extending guideway 15 to slidably accommodate a block 16. The block 16, in turn, has a vertical edge 17 formed with a guideway 18 to slidably accommodate a locating member 19, the latter being L-shaped and including an offset portion having horizontal upper and lower faces 20, 21, respectively. It will be apparent that when the device is in the position shown in FIGURE 1, the lower face 21 of the locating member 19 is co-planar with the base edge 12 of the body 11 on the supporting surface 13, but that the face 21 may be raised from the supporting surface by sliding the block 16 along the inclined edge 14, as indicated at 22 and, in addition, that the face 21 may be raised or lowered with respect to the surface 13 by sliding the member 19 relative to the block 16, as indicated at 23.

One side of the body 11 adjacent the inclined edge 14 is formed with a recess 24 having a toothed rack 25 secured therein by suitable screws 26. As is best shown in FIGURE 4, the rack 25 meshes with a gear 27 which is formed integrally with an indicator dial or disc 28 and is secured therewith by a screw 29 to a transverse shaft or pin 30, rotatably mounted in the block 16. The dial 28 is provided with graduations 31 which are readable with respect to a reference line 32 on the block 16, this being so arranged that when the dial 28 is rotated by sliding of the block 16 along the inclined edge 14 of the body 11, the graduations 31 indicate the height or distance of the face 21 (or of the face 20) above the base edge 12 and, consequently, above the surface 13.

Means are provided for releasably locking the block 16 in a preadjusted position on the edge 14. These means consist of a locking member 33 which is slidably disposed in the block 16 and in the guideway 15 of the body 11, as illustrated in FIGURE 5. A transverse shaft 34 is rotatably positioned in the block 16 and has a cam portion 35 disposed in an aperture in the member 33, so that when the shaft 34 is turned slightly by means of a handle 36 with which it is equipped, the cam portion 35 will slide the member 33 in the block 16 sufficiently for the member 33 to frictionally bind in the guideway 15 and prevent sliding of the block relative to the body 11. The shaft 34 is rotatably retained in the block by a suitable screw 37.

Sliding of the locating member 19 relative to the block 16 is effected by a micrometer screw 38 which is rotatably positioned in the block, being retained therein by a suitable keeper plate 39 and screw 40, as will be clearly apparent. A partial nut element 41 operatively engages the screw 38 and is secured by an integral stud 42 to the locating member 19, the stud 42 being locked in place by a set screw 43, as shown in FIGURES 6 and 7. The upper end of the screw 38 is provided with a graduated hand or finger knob 43 and the block 16 is formed with a recess 44 to provide a clearance for the nut element 41 when the latter moves upwardly or downwardly with the member 19 relative to the block, while the screw is rotated by the knob 43. The graduations on the knob 43 are readable with respect to a suitable reference line 44 on the plate 39 and, in addition, a reference line 45 is provided on the member 19 and is readable against graduations 46 provided on the block 16. The screw 38 with the nut element 41 and the graduations 46 as well as those on the knob 43 facilitate micrometer readings of the setting of the member 19 with respect to the block 16 in co-ordination with the distance of the faces 20 or 21 from the base edge 12 and supporting surface 13.

It may be noted that the height or thickness, indicated at 47, of the offset portion of the locating member 19 is preferably held at a close tolerance, so that the distance between the faces 20, 21 may be accurately taken into consideration and either the face 20 or the face 21 used in the taking of measurements.

When the invention is placed in use, such as for example, in setting the height of a cutting tool above a work supporting table, the instrument is positioned on the table (as represented by the surface 13), and the block 16 is slid along the edge 14 of the body 11 until the face 20 of the member 19 is approximately at the elevation desired. Thereupon, the micrometer screw 38 is turned so as to bring the face 20 to the exact desired level, the block 16 being prevented from sliding by the locking means 33—36, of course, before the micrometer setting is effected. The cutting tool may then be brought in contact with the face 20 and set accordingly, after which the instrument is removed and work undertaken. Similarly, the lower face 21 may be used for measuring the thickness or height of objects placed on the surface 13 under the locating member 19, and measurements of depth may be made in a like manner.

It may be noted that on the basis of a 30° angle between the edges 12 and 14, a given amount of sliding movement of the block 16 on the edge 14 corresponds to only one-half that amount in terms of vertical movement of the block, so that any error in the setting of the dial 28 is reduced to one-half in the vertical setting of the block. If desired, the locating member 19 may be provided with screw-threaded bores 48, 49 for attachment of extension rods, scribers, et cetera (not shown), such as may be used in conjunction with the instrument.

While in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a measuring instrument, the combination of a body having a horizontal base edge adapted for positioning on a supporting surface and an inclined upper edge, a block slidable longitudinally on said inclined edge and having a vertical side edge, a locating member slidable vertically on said side edge and having a horizontal face movable to a contact with and away from the supporting surface on which said base edge is positioned, and means for indicating the distance of said face from the plane of said base edge which is positioned on said supporting surface.

2. The device as defined in claim 1 wherein said means comprise an indicator dial rotatably mounted on said block and provided with graduations readable with respect to a reference line on the block, a toothed rack provided at the inclined edge of said body, and a gear rotatable with said dial and meshing with said rack.

3. In a measuring instrument, the combination of a triangular body having a horizontal base edge adapted for positioning on a supporting surface and an upper edge inclined by an acute angle from said base edge, a block slidable longitudinally on said inclined edge and having a vertical side edge, means provided on said block and on said body for indicating the position of the block relative to said base edge in coordination with the position of the block relative to said inclined edge, a locating member slidable vertically on the vertical edge of said block and having a horizontal face movable to a contact with and away from the supporting surface on which said base edge, and means provided on said block for indicating the distance of said face from the plane of said base in coordination with the first mentioned indicating means and with the position of said locating member relative to said block.

4. The device as defined in claim 3 wherein said first mentioned means comprise an indicator dial rotatably mounted on said block and provided with graduations readable with respect to a reference line on the block, a toothed rack provided at the inclined edge of said body, and a gear rotatable with said dial and meshing with said rack.

References Cited in the file of this patent

UNITED STATES PATENTS

| | | |
|---|---|---|
| 2,400,441 | Sconce | May 14, 1946 |
| 2,547,114 | Ellis | Apr. 3, 1951 |
| 2,821,022 | Woodward | Jan. 28, 1958 |